United States Patent
Fukuda et al.

(10) Patent No.: US 8,264,325 B2
(45) Date of Patent: Sep. 11, 2012

(54) BIOMETRIC AUTHENTICATION APPARATUS AND BIOMETRIC DATA REGISTRATION APPARATUS

(75) Inventors: Mitsuaki Fukuda, Kawasaki (JP); Soichi Hama, Kawasaki (JP); Takahiro Aoki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 641 days.

(21) Appl. No.: 12/409,774

(22) Filed: Mar. 24, 2009

(65) Prior Publication Data
US 2009/0243798 A1    Oct. 1, 2009

(30) Foreign Application Priority Data
Mar. 25, 2008    (JP) .................... 2008-078456

(51) Int. Cl.
*H04Q 9/00* (2006.01)
*H04Q 1/00* (2006.01)
*H04Q 3/00* (2006.01)
*G05B 19/00* (2006.01)

(52) U.S. Cl. .............. 340/5.82; 340/5.52; 340/5.83
(58) Field of Classification Search ............ 340/5.52, 340/5.53, 5.82; 382/115–127
See application file for complete search history.

(56) References Cited

U.S. PATENT DOCUMENTS

| | | | |
|---|---|---|---|
| 5,815,252 A * | 9/1998 | Price-Francis | 356/71 |
| 6,873,713 B2 * | 3/2005 | Okazaki et al. | 382/118 |
| 6,980,673 B2 * | 12/2005 | Funahashi | 382/124 |
| 7,254,256 B2 * | 8/2007 | Chen et al. | 382/117 |
| 7,266,223 B2 * | 9/2007 | Miura et al. | 382/115 |
| 7,565,548 B2 * | 7/2009 | Fiske et al. | 713/186 |
| 2005/0100199 A1 | 5/2005 | Boshra | |
| 2005/0139685 A1 * | 6/2005 | Kozlay | 235/492 |
| 2006/0078170 A1 * | 4/2006 | Kamata et al. | 382/115 |
| 2007/0098223 A1 | 5/2007 | Kamata et al. | |
| 2008/0063244 A1 * | 3/2008 | Tanaka et al. | 382/115 |

FOREIGN PATENT DOCUMENTS

| | | |
|---|---|---|
| EP | 1239404 A2 | 9/2002 |
| EP | 1903509 A1 | 3/2008 |
| JP | 2001-273498 A | 10/2001 |
| JP | 2003-248828 A | 9/2003 |
| JP | 2007-058643 A | 3/2007 |
| JP | 2007-122368 A | 5/2007 |

OTHER PUBLICATIONS

Japanese Office Action dated Feb. 9, 2010, issued in corresponding Japanese Patent Application No. 2008-078456.
Extended European Search Report dated Apr. 28, 2010, issued in corresponding European Patent Application No. 09155263.

* cited by examiner

*Primary Examiner* — Daniel Wu
*Assistant Examiner* — Mohamed Barakat
(74) *Attorney, Agent, or Firm* — Westerman, Hattori, Daniels & Adrian, LLP (57) ABSTRACT

In accordance with input user ID, a personal template fetcher reads biometric feature data and biometric shape data from a template storage. A verification area finder determines a verification area that matches a detection area of a verification sensor within an area of biometric features. A guide information generator combines the verification area with a contour shape reconstructed from the biometric shape data, received from the personal template fetcher, to generate a guide pattern. A guide information presenter presents the generated guide pattern to the user. A verification sensor extracts biometric feature information from an input image of biometric features and converts it into numeric data to obtain biometric feature data. A biometric feature verifier then verifies the biometric feature data obtained by the verification sensor in comparison with the biometric feature data received from the personal template fetcher in the verification area received from the verification area finder.

9 Claims, 9 Drawing Sheets

BIOMETRIC AUTHENTICATION APPARATUS AND BIOMETRIC DATA REGISTRATION APPARATUS

CROSS-REFERENCE TO RELATED APPLICATIONS

This application is based upon and claims the benefit of priority of the prior Japanese Patent Application No. 2008-078456, filed on Mar. 25, 2008, the entire contents of which are incorporated herein by reference.

FIELD

The embodiments discussed herein are related to a biometric authentication apparatus which performs personal authentication by using a part of a human body.

BACKGROUND

Biometric authentication technologies for performing authentication based on features of a body part, such as a fingerprint, veins, a facial image, and an iris, have been put into practical use. Biometric authentication requires a registration stage at which biometric features of a user are obtained in advance by a sensor and stored in a storage. Thereafter, at a verification stage, biometric features obtained by a sensor are verified in comparison with the biometric features stored, at the registration stage, in the storage.

What is important for appropriately achieving the biometric authentication is whether or not the same biometric features as those obtained at the registration stage may be obtained at the verification stage. In biometric authentication based on palm veins, for example, high-accuracy authentication may not be performed by capturing and storing feature data of palm veins of an upper right part of one's palm at the time of registration and capturing feature data of palm veins of a lower left part of the palm at the time of verification.

In order to conduct biometric authentication with high accuracy, it is important to obtain biometric features of the same area both at the time of verification and of registration. This issue has been a common challenge for almost all biometric authentication technologies, and some schemes have been proposed.

For example, Japanese Laid-open Patent Publication No. 2001-273498 discusses an apparatus which displays, on a screen, a guide pattern in the shape of a body-part contour to indicate an ideal capturing position and superimposes a body-part image captured with a sensor when obtaining biometric features at the time of verification. Japanese Laid-open Patent Publication No. 2007-58643 discusses a finger-vein authentication apparatus which has a fingertip guide movable back and forth with which a tip of a finger makes contact. The position of the fingertip guide at the time of registration is recorded to be reproduced at the time of verification. In addition, Japanese Laid-open Patent Publication No. 2007-122368 discusses a system which displays, at the time of verification, a contour image captured at the time of registration on a screen. The system also displays an image captured at the time of verification for comparison with the image obtained at the time of registration.

These proposed biometric authentication schemes suppose that the sensor used at the registration stage and the sensor used at the verification stage have the same shape. In some cases, however, the shape of the sensor used at the registration stage may be different from the shape of the sensor used at the verification stage. Examples of such cases include a case in which a verification sensor, i.e. a sensor used at the time of verification, has a detection area, i.e. an area where biometric-features are obtained, smaller than that of a registration sensor, i.e. a sensor used at the time of registration. Another example is a case in which cameras are used as sensors and the camera used at the time of verification has smaller eyeshot than the camera used at the time of registration. When the area of a body part that may be obtained at the time of verification is smaller that the area of a body part obtained at the time of registration, an authentication apparatus may not figure out with which area of the body part obtained at the time of registration it should align the body part obtained at the time of verification. Thus, it takes time for the verification. In addition, erroneous alignment may cause authentication error, such as coincidence with a different person's data.

In addition, when the distribution of biometric features is uneven, the amount of information of the obtained biometric features varies depending on the position where the biometric features are obtained by a sensor at the time of registration. Naturally, for a part where the amount of information of obtained biometric features is small, the amount of information that may be used for authentication is smaller compared to a part where the amount of information is large. As a result, the authentication accuracy may decrease. When the part from which biometric features are obtained is not a suitable part for biometric authentication, high-accuracy biometric authentication may not be performed even when biometric features are obtained from the same part both at the time of registration and of verification.

SUMMARY

According to an aspect of the present invention, provided is a biometric authentication apparatus for authenticating users. The biometric authentication apparatus includes an ID acceptor, a personal template fetcher, a verification sensor, a guide information presenter, and a biometric feature verifier. The ID acceptor accepts input of a user ID. The personal template fetcher fetches a personal template corresponding to the user ID. The personal template contains registered biometric feature data and registered biometric shape data. The verification sensor obtains input biometric feature data of a user. The guide information presenter presents guide information to guide, in accordance with the registered biometric shape data and data indicating a position of a verification area, the user to place a body part of the user over the verification sensor so as to obtain the input biometric feature data in an area corresponding to the verification area. The verification area is within the body part providing biometric features corresponding to the registered biometric feature data. The verification area corresponds to a detection area of the verification sensor. The verification area provides optimum amount of information of the biometric features. The biometric feature verifier verifies the input biometric feature data in comparison with the registered biometric feature data in the verification area.

According to another aspect of the present invention, provided is a biometric data registration apparatus for registering biometric data. The biometric data registration apparatus includes an ID acceptor, a registration sensor, an image separator, and a personal template generator. The ID acceptor accepts input of a user ID. The registration sensor captures an image of a body part of a user to the extent that an image of a shape of the body part is included. The body part provides biometric features. The image separator separates a captured image of the body part into an image of biometric features and an image of a biometric shape. The personal template generator generates a personal template containing the user ID, biometric feature data obtained from the image of the biometric features, and biometric shape data obtained from the image of the biometric shape.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Embodiments of the present invention will be described below with reference to the accompanying drawings.

First Embodiment

Figure 1:
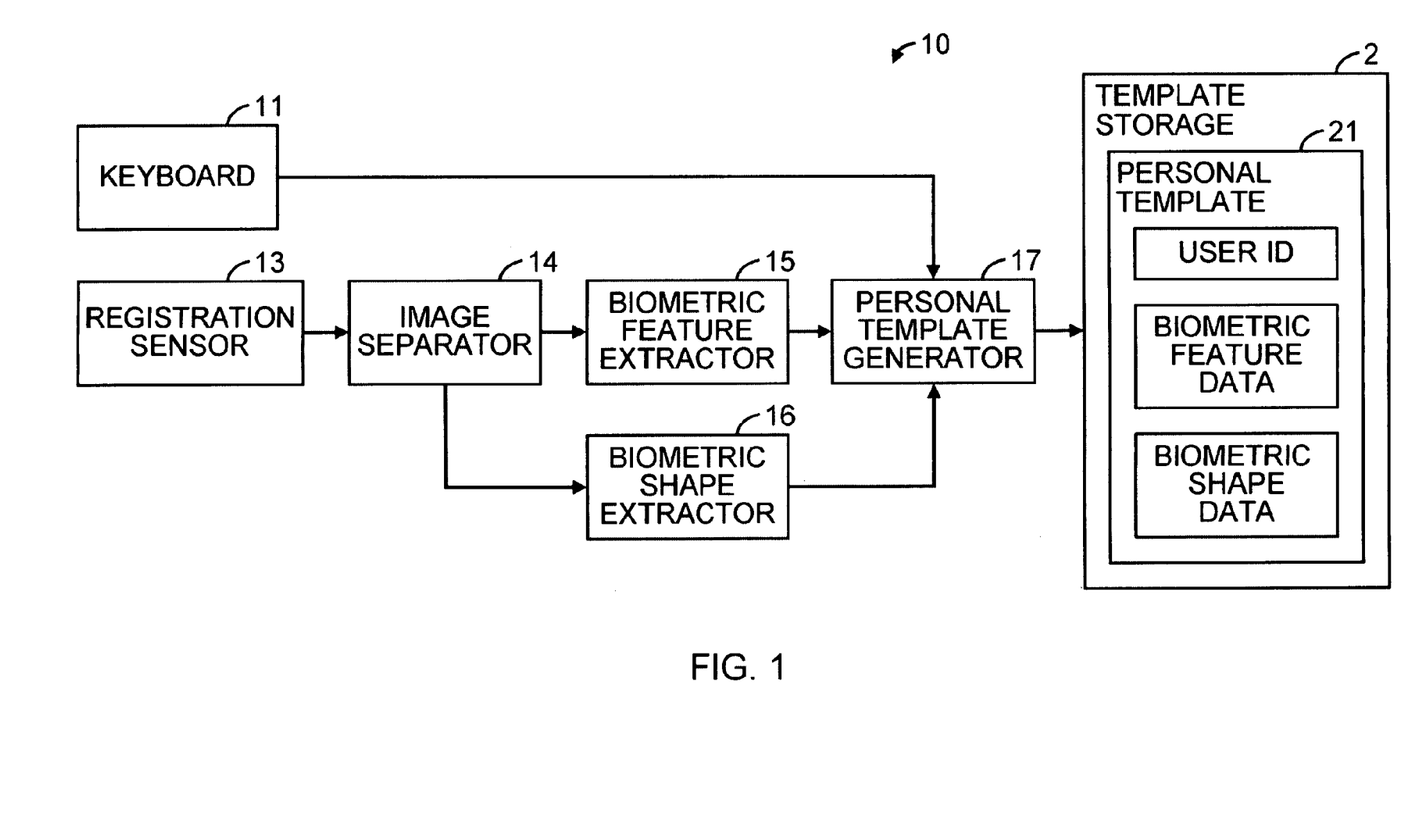
FIG. 1 is a block diagram illustrating an overview of a biometric data registration apparatus for registering biometric feature data according to a first embodiment of the present invention.

FIG. 1 is a block diagram illustrating an overview of a biometric data registration apparatus for registering biometric feature data according to a first embodiment of the present invention.

A biometric data registration apparatus 10 includes a keyboard 11 and a registration sensor 13. The keyboard 11 is used to input a user ID (identification) that uniquely indicates a user. The user ID may be a number or a character string. The registration sensor 13 captures an image (referred to as a biometric image) of a part of user's body to obtain user's biometric feature data to be registered. The user ID input via the keyboard 11 is sent to a personal template generator 17 and serves as an index to a registered personal template.

The user ID may be input using a magnetic card, an IC (integrated circuit) card, or another input means. The registration sensor 13 may be an area sensor such as a camera, or a line sensor. In addition, for example, the registration sensor 13 may be, for example, a device that obtains fingerprint data by capturing an image upon contact.

The registration sensor 13 captures a biometric image in a large area including all biometric features used for personal authentication. In other words, the registration sensor 13 captures a biometric image in an area that is large enough to allow for recognition of a shape of a body part providing biometric features (the shape is hereinafter referred to as a "biometric shape"). Depending on the type of the registration sensor 13, images may be obtained by multiple capturing operations while the capturing position is gradually shifted, rather than completing the image capture by a single capturing operation. In this case, the images obtained through the multiple operations are combined into an image of a body part in a desired area.

The biometric image captured by the registration sensor 13 is sent to an image separator 14. The image separator 14 separates the biometric image into an image of biometric features required for personal authentication and an image of a biometric shape. The image of biometric features separated from the biometric image is sent to a biometric feature extractor 15. The biometric feature extractor 15 extracts biometric feature information from the image of biometric features and converts it into numeric data to obtain biometric feature data. The image of biometric shape separated from the biometric image is, on the other hand, sent to a biometric shape extractor 16. The biometric shape extractor 16 extracts biometric shape information from the image of a biometric shape and converts it into numeric data to obtain biometric shape data.

The biometric feature data obtained by the biometric feature extractor 15 and the biometric shape data obtained by the biometric shape extractor 16 are sent to the personal template generator 17. The personal template generator 17 generates a personal template 21 containing the user ID, biometric feature data, and biometric shape data. The generated personal template 21 is stored in a template storage 2. The template storage 2 may be provided inside the biometric data registration apparatus 10 or may be provided outside the biometric data registration apparatus 10.

As described above, since biometric features are obtained at the time of registration in a large area to the extent that a biometric shape may be obtained, it is possible to prevent biometric feature data from being obtained from an area providing a small amount of information due to uneven biometric features.

Figure 2:
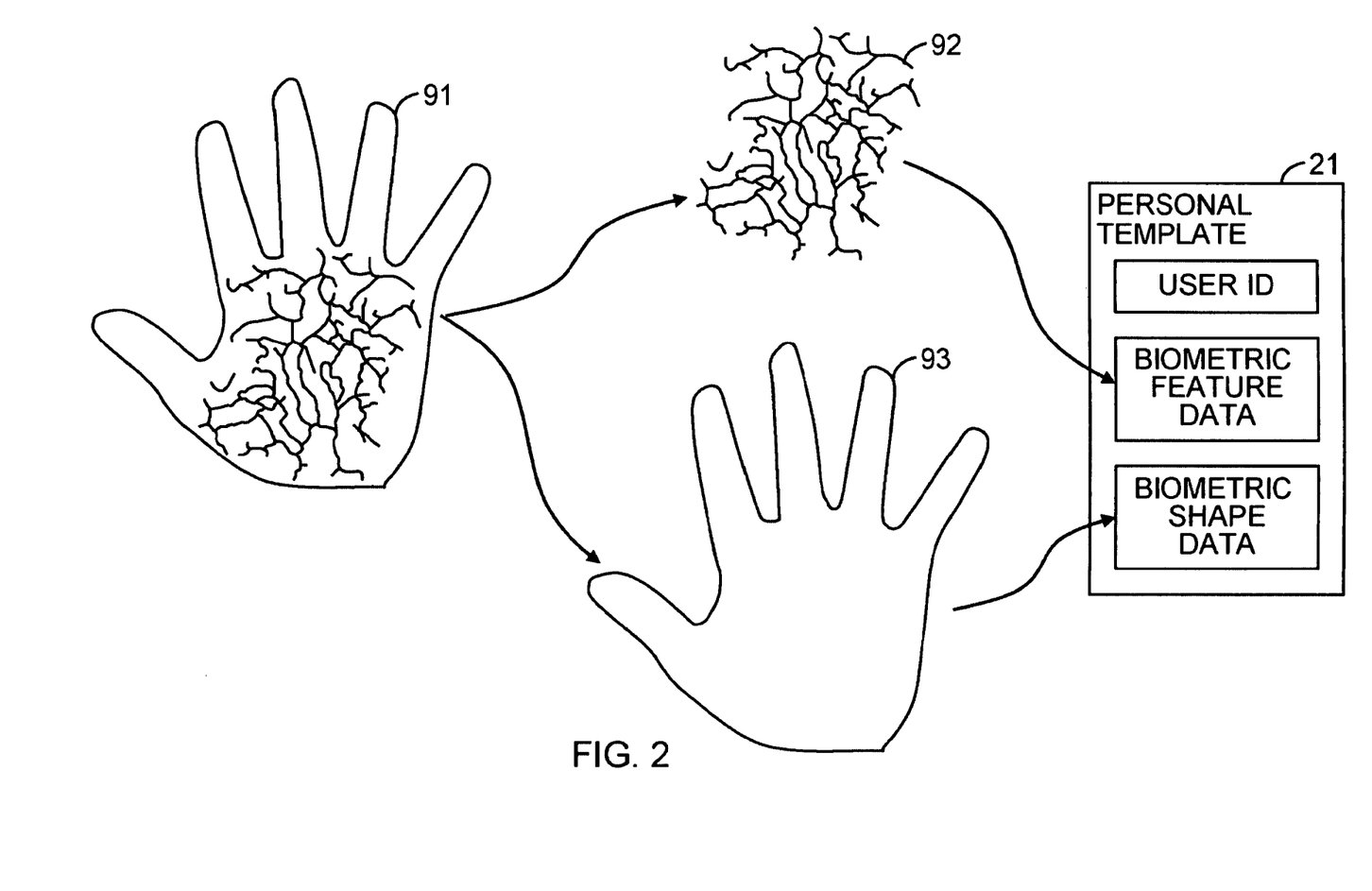
FIG. 2 is a diagram illustrating registration of palm vein data according to a first embodiment of the present invention.

FIG. 2 is a diagram illustrating registration of palm vein data according to a first embodiment of the present invention. The registration sensor 13 obtains a palm vein image 91 from a palm of the user and the image separator 14 separates the palm vein image 91 into a vein image 92 and a contour image 93. The biometric feature extractor 15 extracts vein features from the vein image 92 and converts the extracted vein features into numeric data. The biometric shape extractor 16 extracts a contour shape from the contour image 93 and converts the extracted contour shape into numeric data. The numeric data of the vein features and the numeric data of the contour shape are stored together with the user ID in the form of the personal template 21.

Figure 3:
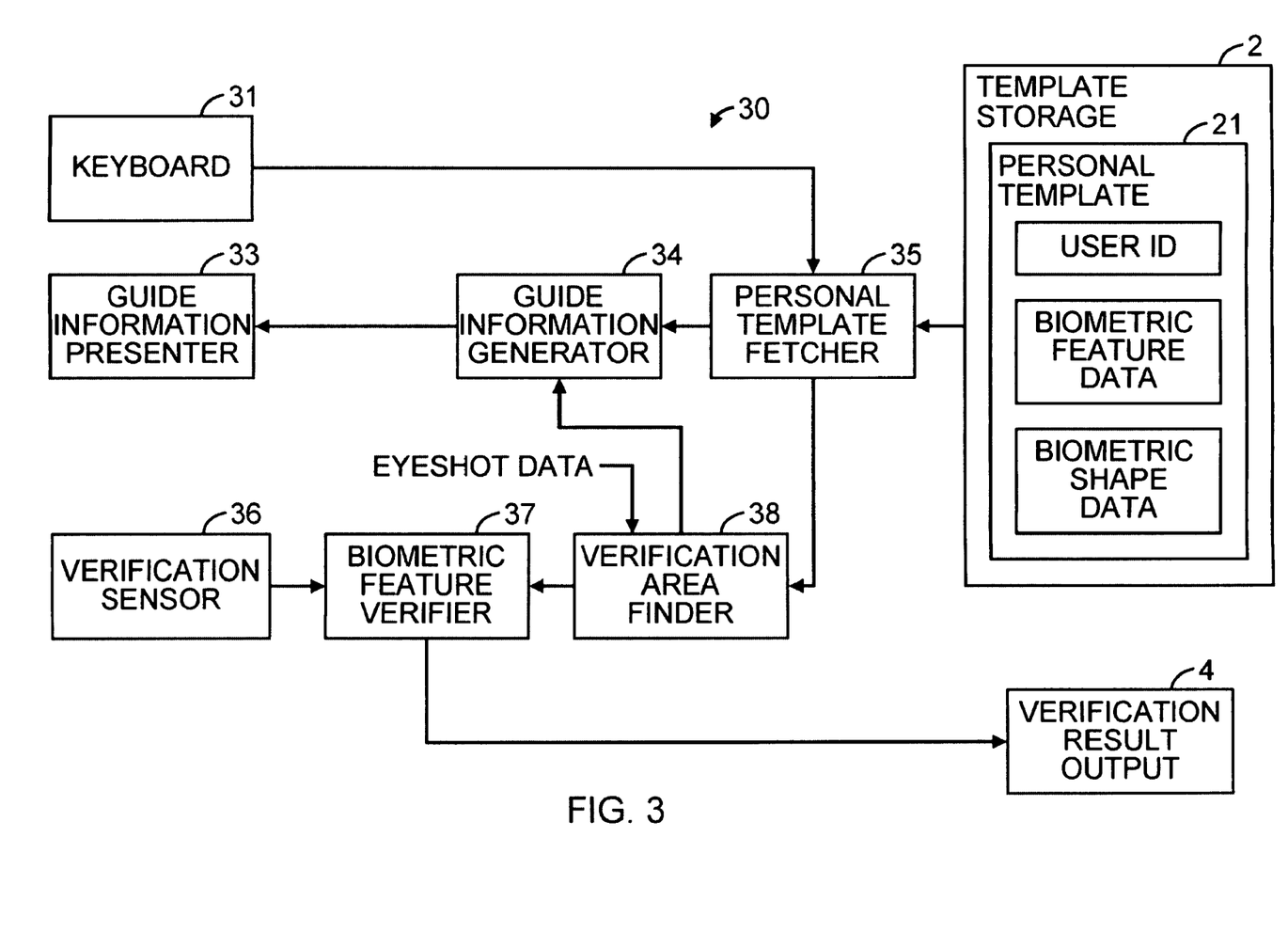
FIG. 3 is a block diagram illustrating an overview of a biometric authentication apparatus according to a first embodiment of the present invention.

FIG. 3 is a block diagram illustrating an overview of a biometric authentication apparatus according to a first embodiment of the present invention. A biometric authentication apparatus 30 includes, as inputting means, a keyboard 31 for inputting a user ID and a verification sensor 36 for obtaining an image of biometric features. The eyeshot of the verification sensor 36 is smaller than the eyeshot of the registration sensor 13 of the biometric data registration apparatus 10. In addition, the shape of the eyeshot of the verification sensor 36 may be different from the shape of the eyeshot of the registration sensor 13.

When the user intends to have an authentication, he/she first inputs a user ID via the keyboard 31. The user ID may also be input using a magnetic card, an IC card, or another input means. The user ID is sent to a personal template fetcher 35. In accordance with received user ID, the personal template fetcher 35 fetches a pertinent personal template 21 from the template storage 2. The template storage 2 may be provided at the biometric data registration apparatus 10 or may be provided at another server. In addition, the template storage 2 may be provided at the biometric authentication apparatus 30.

The personal template fetcher 35 sends the biometric feature data and the biometric shape data, contained in the personal template 21, to a verification area finder 38. Eyeshot data regarding the shape and size of the eyeshot representing a detection area of the verification sensor 36 is further input to the verification area finder 38. The eyeshot data may be obtained from the product number of the verification sensor 36 or may be read from a storage (not illustrated) of the biometric data registration apparatus 10. Alternatively, when the verification sensor 36 is provided, eyeshot data regarding the shape and size of the eyeshot of the verification sensor 36 may be set in advance to the verification area finder 38.

The verification area finder 38 determines a partial area that the verification sensor 36 may capture a biometric image within the area of body part providing the biometric features corresponding to biometric feature data contained in the personal template 21. For example, it is assumed that the size of the area where the registration sensor 13 has captured the biometric image and which is stored in the personal template 21 is a 10 cm×10 cm rectangular area and the size of the eyeshot of the verification sensor 36 is a 1 cm×1 cm rectangular area. A 1 cm×1 cm area having the highest density of biometric features is extracted from the 10 cm×10 cm area and is used as a capturing area of the verification sensor 36.

The method for selecting a small area that corresponds to the eyeshot of the verification sensor 36 and that has the highest density of biometric features from a large area providing biometric features is not particularly limited. For example, densities of biometric features may be sequentially calculated while a window having the same size as the verification sensor 36 is gradually shifted within the large area providing biometric features. Upon completion of the calculation of the densities of all shifted windows, the highest density area obtained through comparison of the results of the determination may be used as a verification area. In order to determine the verification area, a frequency component of an image may also be used instead of the density of biometric features. That is, frequency components are determined instead of the densities and an area providing the optimum amount of high-frequency components may be used as the verification area.

Upon determination of the verification area, the result is sent to a guide information generator 34. The guide information generator 34 may generate a guide pattern for presenting the verification area of the verification sensor 36 to the user. The guide information generator 34 combines the verification area with the contour shape reconstructed from the biometric shape data, received from the personal template fetcher 35, to generate a guide pattern. The generated guide pattern is presented to the user via a guide information presenter 33 which is provided at a place viewable by the user. The guide information presenter 33 may have a display screen to display the guide pattern.

In accordance with the guide pattern, the user aligns the verification area of his/her body with the eyeshot of the verification sensor 36. The verification sensor 36 captures an image of biometric features in the verification area, extracts biometric feature information from the image of biometric features, converts extracted biometric feature information into numeric data to obtain biometric feature data, and sends obtained biometric feature data to a biometric feature verifier 37. The biometric feature verifier 37 then verifies received biometric feature data in comparison with the registered biometric feature data in the verification area received from the verification area finder 38, to thereby perform authentication.

As discussed above, at the time of verification, in accordance with the shape and size of the eyeshot of the verification sensor 36, a verification area providing the optimum amount of information of biometric features is determined within the entire area of the body part providing biometric features corresponding to the registered biometric feature data so that the authentication accuracy becomes the highest. Since the shape and size of the verification area are the same as the shape and size of the eyeshot of the verification sensor 36, verification may be performed with the highest accuracy to the extent that an image may be captured in the eyeshot of the verification sensor 36.

Figure 4:
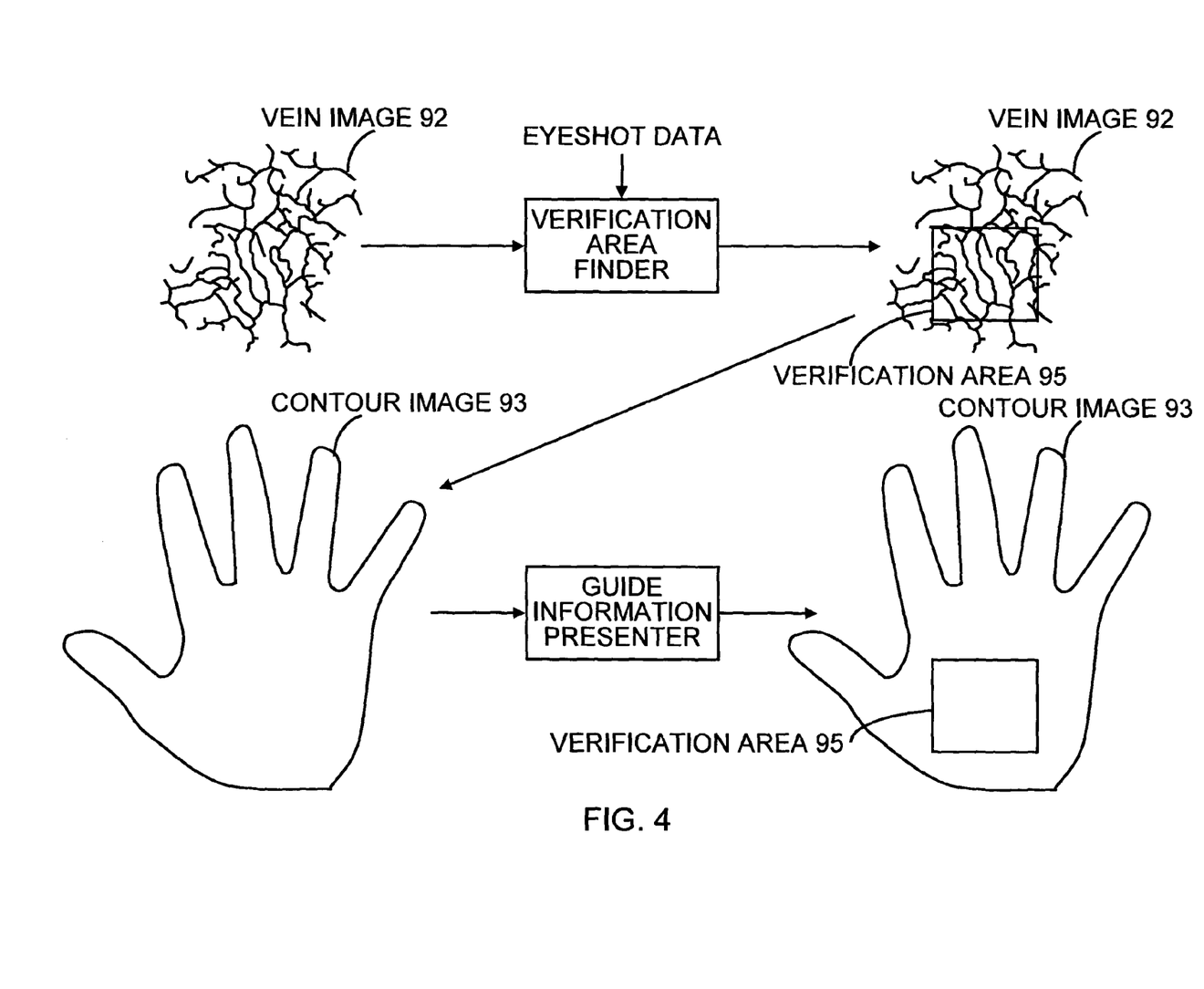
FIG. 4 is a diagram illustrating a method for presentation of a guide pattern for a user in biometric authentication using palm veins according to a first embodiment of the present invention.

FIG. 4 is a diagram illustrating a method for presentation of a guide pattern for a user in biometric authentication using palm veins according to a first embodiment of the present invention. The vein image 92 reconstructed from the biometric feature data read from the personal template 21 is the image captured by the registration sensor 13 and shows veins of an entire palm. On the basis of the eyeshot data of the verification sensor 36, the verification area finder 38 determines, within the vein image 92, a verification area 95 providing the optimum amount of information.

The guide information generator 34 combines the determined verification area 95 with the contour image 93 reconstructed from biometric shape data read from the personal template 21. Consequently, as illustrated in FIG. 4, the verification area 95 is superimposed on the contour image 93 to provide a guide pattern. The user may appropriately place his/her palm over the verification sensor 36 while viewing the guide pattern.

Figure 5:
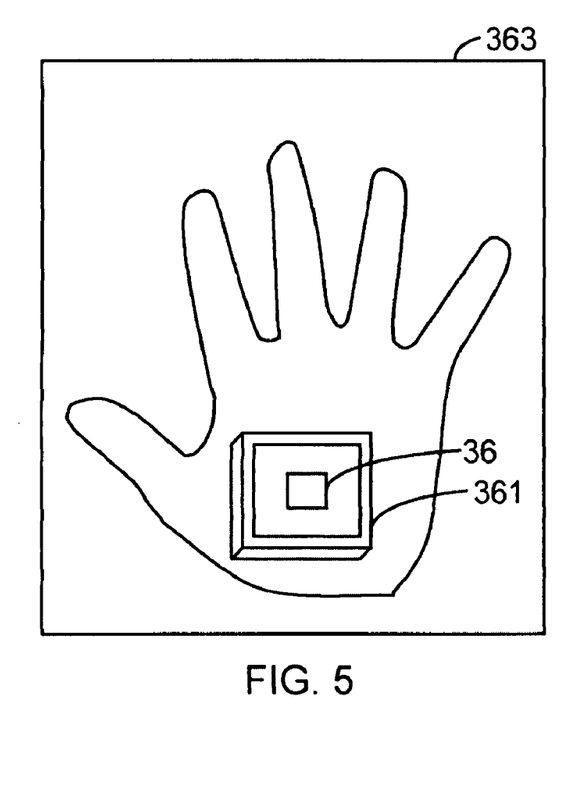
FIG. 5 is a diagram illustrating another example of a guide pattern showing a biometric shape according to a first embodiment of the present invention.

FIG. 5 is a diagram illustrating another example of a guide pattern showing a biometric shape according to a first embodiment of the present invention. In FIG. 5, a palm support frame 361 corresponding to the eyeshot of the verification sensor 36 is provided around the verification sensor 36. The palm support frame 361 is used to place a user's palm thereon and direct the user's palm to the verification sensor 36. The palm support frame 361 in the example illustrated in FIG. 5 has a rectangular tube shape. The verification sensor 36 and the palm support frame 361 are disposed on a display unit 363 such as a liquid crystal device or electronic paper. The display unit 363 displays the contour image of a palm of the user himself/herself so that the verification area fits in the palm support frame 361. When the user places his/her palm on the palm support frame 361 so that the palm matches the displayed palm contour image, the palm is located at an adequate position to the verification sensor 36. The display unit 363 may be provided only outside the palm support frame 361.

Figure 6:
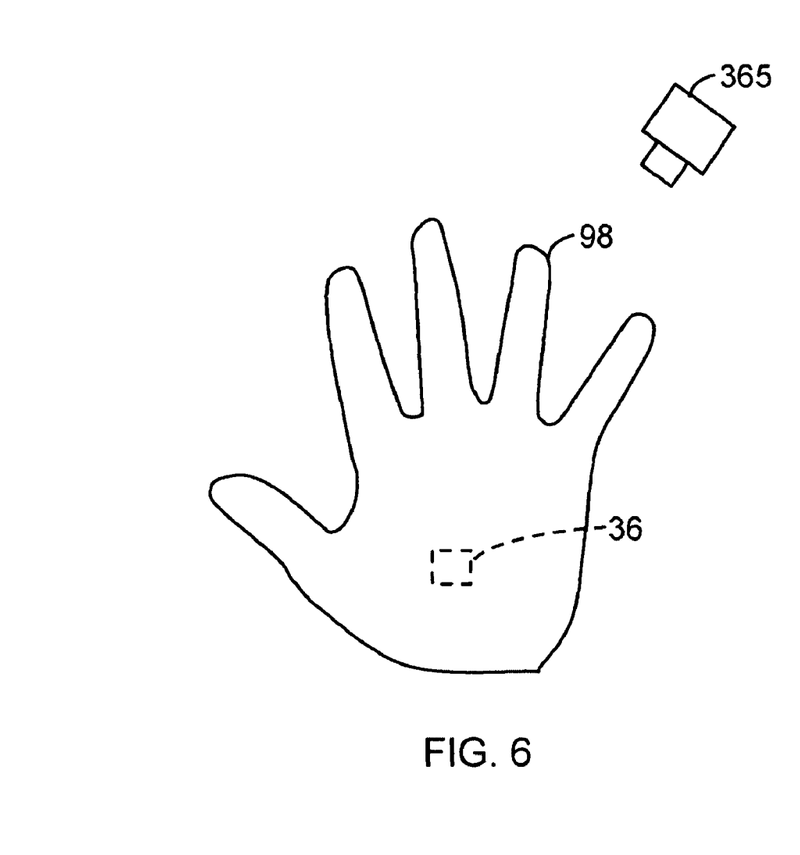
FIG. 6 is a diagram illustrating another example of presentation of a guide pattern according to a first embodiment of the present invention.

FIG. 6 is a diagram illustrating another example of presentation of a guide pattern according to a first embodiment of the present invention. The method for showing the position of a body part for alignment with the verification sensor 36 is not limited to a method using a display device. For example, when a palm is to be aligned with the verification sensor 36, an image of an actual palm 98 that is placed over the verification sensor 36 is captured from above the palm 98 by a visible-light camera 365 to obtain the shape of the palm 98 to be verified. Subsequently, the shape of the palm 98 is compared with the palm shape that is reconstructed from the data obtained by the registration sensor 13 and aligned so that the verification area matches the eyeshot of the verification sensor 36. When the result of the comparison shows that the palm 98 to be verified is displaced from the adequate position, a direction toward the adequate position is expressed by sound, speech, or light. When the user moves the palm 98 in that direction and the palm 98 reaches the adequate position, sound, speech, or light indicating that the palm 98 is located at the adequate position is issued. Alternatively, the sound, speech, or light that has been emitted may be turned off.

Figure 7:
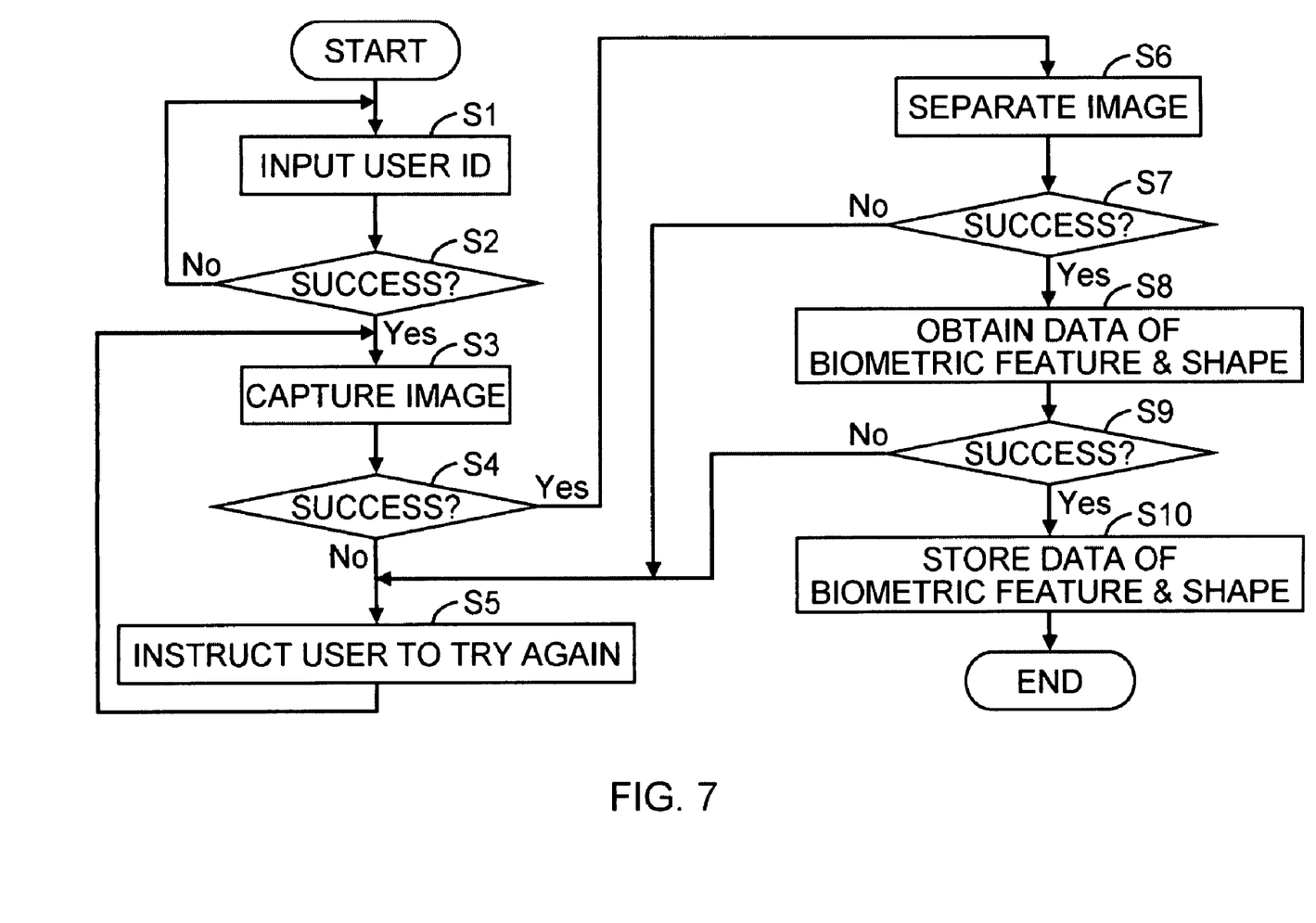
FIG. 7 is a flowchart illustrating a flow of a biometric data registration process performed by a biometric data registration apparatus according to a first embodiment of the present invention.

FIG. 7 is a flowchart illustrating a flow of a biometric data registration process performed by a biometric data registration apparatus according to a first embodiment of the present invention. Registration of palm vein data is described by way of example with reference to FIG. 7.

(Operation S1) Upon start of the registration process, first, a user ID is input via the keyboard 11.

(Operation S2) A determination is made as to whether or not the user ID has been appropriately input. When the user ID has not been appropriately input ("No" in operation S2), the process returns to operation S1.

(Operation S3) When the user ID has been appropriately input ("Yes" in operation S2), an image of an entire palm is captured by the registration sensor 13.

(Operation S4) A determination is made as to whether or not the image capture has been appropriately performed.

(Operation S5) When the image capture has not been appropriately performed ("No" in operation S4), the user is instructed to place his/her palm over the registration sensor 13 again. Subsequently, the process returns to operation S3.

(Operation S6) When the image capture has been appropriately performed ("Yes" in operation S4), the image separator 14 analyzes the captured biometric image of the entire palm and separates the biometric image into an image of biometric features used for verification and an image of a biometric shape used for displaying a guide pattern for the user.

(Operation S7) A determination is made as to whether or not the biometric image has been appropriately separated. When it is determined that the biometric image has not been appropriately separated ("No" in operation S7), the process returns to operation S5.

(Operation S8) When the biometric image has been appropriately separated into an image of biometric features and an image of a biometric shape, the biometric feature extractor 15 extracts biometric feature information from the image of biometric features and the biometric shape extractor 16 extracts biometric shape information from the image of a biometric shape. The extracted biometric feature information and the extracted biometric shape information are converted into corresponding numeric data to obtain biometric feature data and biometric shape data, respectively.

(Operation S9) A determination is made as to whether or not the biometric feature data and the biometric shape data have been appropriately obtained. When the biometric feature data and the biometric shape data have not been appropriately obtained ("No" in operation S9), the process returns to operation S5.

(Operation S10) When it is determined that the biometric feature data and the biometric shape data have been appropriately obtained, the user ID, the biometric feature data, and the biometric shape data are stored in the form of the personal template 21, and the registration process ends.

Figure 8:
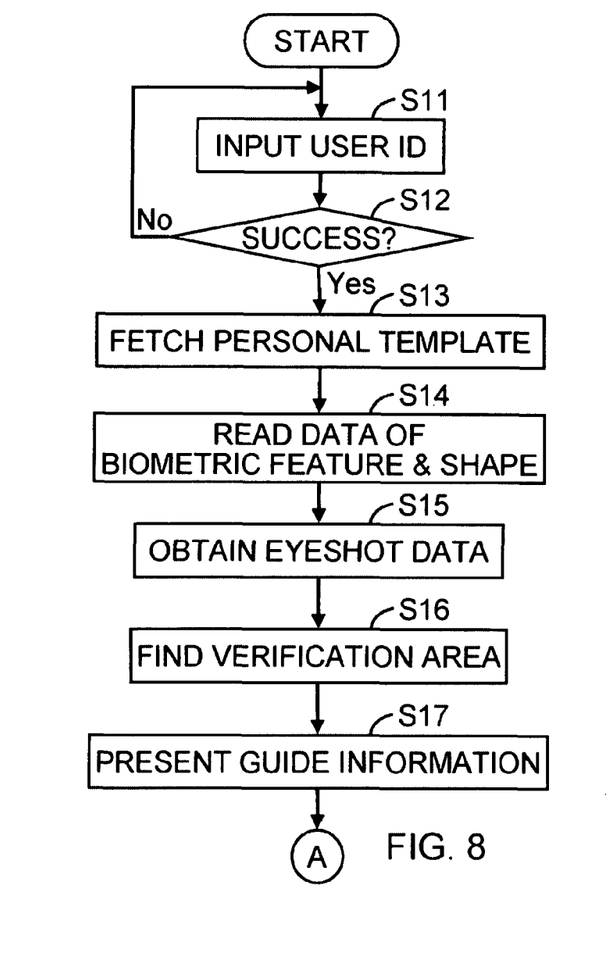
FIGS. 8 and 9 are flowcharts illustrating a flow of a verification process performed by a biometric authentication apparatus according to a first embodiment of the present invention.
Figure 9:
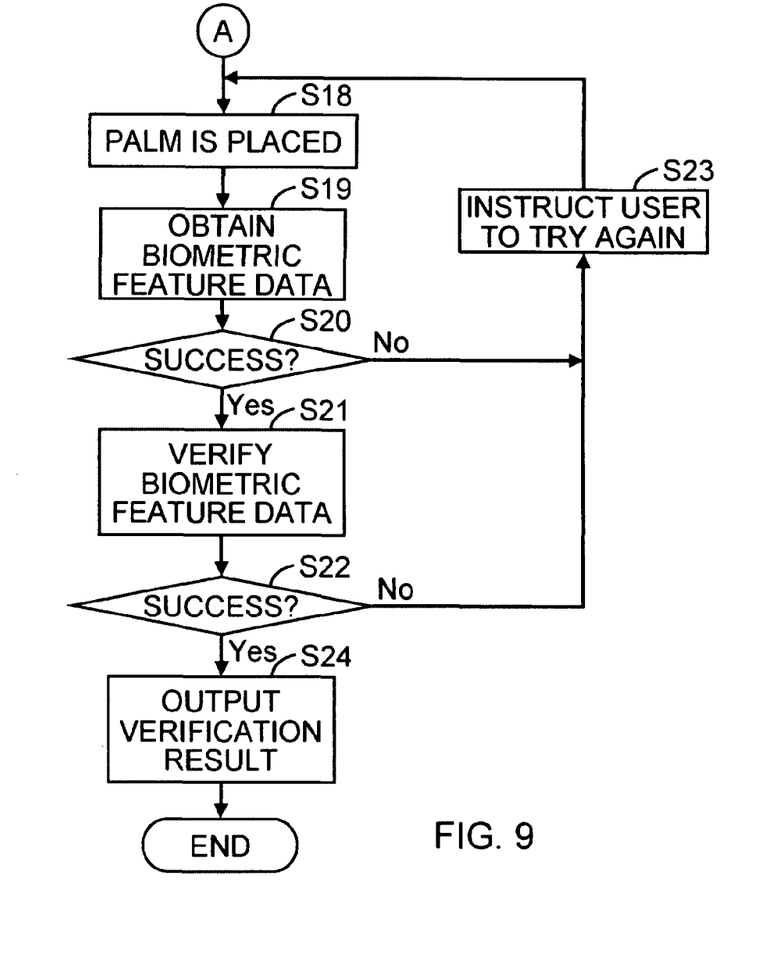

FIGS. 8 and 9 are flowcharts illustrating a flow of a verification process performed by a biometric authentication apparatus according to a first embodiment of the present invention. A discussion on the verification process is also given in conjunction with an example of verification of palm veins. In the first embodiment, it is assumed that the eyeshot of the verification sensor 36 is smaller than the eyeshot of the registration sensor 13.

(Operation S11) Upon start of the biometric authentication process, the user inputs a user ID via the keyboard 31.

(Operation S12) A determination is made as to whether or not the user ID has been appropriately input. When the user ID has not been appropriately input ("No" in operation S12), the process returns to operation S11.

(Operation S13) When the user ID has been appropriately input ("Yes" in operation S12), the personal template fetcher 35 fetches a personal template 21 corresponding to the user ID from the template storage 2.

(Operation S14) The verification area finder 38 reads biometric feature data and biometric shape data from the fetched personal template 21.

(Operation S15) The verification area finder 38 obtains eyeshot data containing data of the shape and size of the eyeshot of the verification sensor 36.

(Operation S16) The verification area finder 38 finds, in accordance with the eyeshot data of the verification sensor 36, a verification area within the large area providing biometric features whose data is read from the personal template 21. Then verification area has a small area corresponding to the eyeshot of the verification sensor 36 and provides the optimum amount of biometric feature data.

(Operation S17) Upon finding the verification area, the guide information generator 34 generates an image indicating where the verification area is located in the biometric shape and presents the generated image onto the guide information presenter 33.

(Operation S18) In accordance with the presented guide pattern, the user places his/her palm over the verification sensor 36.

(Operation S19) The verification sensor 36 obtains biometric feature data of palm veins in the verification area. Since the verification sensor 36 may obtain biometric feature data of palm veins in the verification area providing the optimum amount of information, it is possible to perform personal authentication with the highest accuracy in the limited eyeshot of the verification sensor 36. That is, it is possible to reduce error such as false rejection and false acceptance.

(Operation S20) A determination is made as to whether or not the obtention of biometric feature data has been appropriately performed. When biometric feature data of palm veins has not been appropriately obtained ("No" in operation S20), the process proceeds to operation S23, in which the user is instructed so as to place his/her palm over the verification sensor 36 again.

(Operation S21) When biometric feature data of palm veins has been appropriately obtained ("Yes" in operation S20), the biometric feature verifier 37 verifies the biometric feature data obtained by the verification sensor 36 in comparison with biometric feature data, in the verification area, contained in the personal template 21.

(Operation S22) A determination is made as to whether or not the verification has been appropriately performed.

(Operation S23) When it is determined that the verification has not been appropriately performed ("No" in operation S22), the user is instructed so as to place his/her palm over the verification sensor 36 again.

(Operation S24) When it is determined that the verification has been appropriately performed ("Yes" in operation S22), a verification result indicating "success" or "failure" is output and the biometric authentication process ends.

As discussed above, according to the first embodiment, even when the shape and size of the eyeshot are different between the registration sensor and the verification sensor, an image of the same body part may be captured at the time of verification as obtained at the time of registration and thus the false rejection rate decreases. Further, since an image of a body part providing the optimum amount of information is captured, the false acceptance rate also decreases. Thus, the authentication accuracy improves.

Accordingly, even when the detection area of the verification sensor is smaller than the detection area of the registration sensor, it is possible to perform high-accuracy biometric authentication.

In addition, since it is possible to simplify the process, which accounts for large proportion of the entire processing time for verification, for aligning the position of the image captured at the time of registration and the image captured at the time of verification, the authentication speed increases.

Additionally, since it is possible to appropriately guide the user by employing the user guide pattern, the capturing time and the operation time may be reduced and the user may feel easy without confusion.

In addition, once registered by a registration apparatus, the registered data may be appropriately used for authentication in various authentication apparatus with different eyeshot, e.g. for entry/exist control, mobile phone, or PC (personal computer) login.

Second Embodiment

Figure 10:
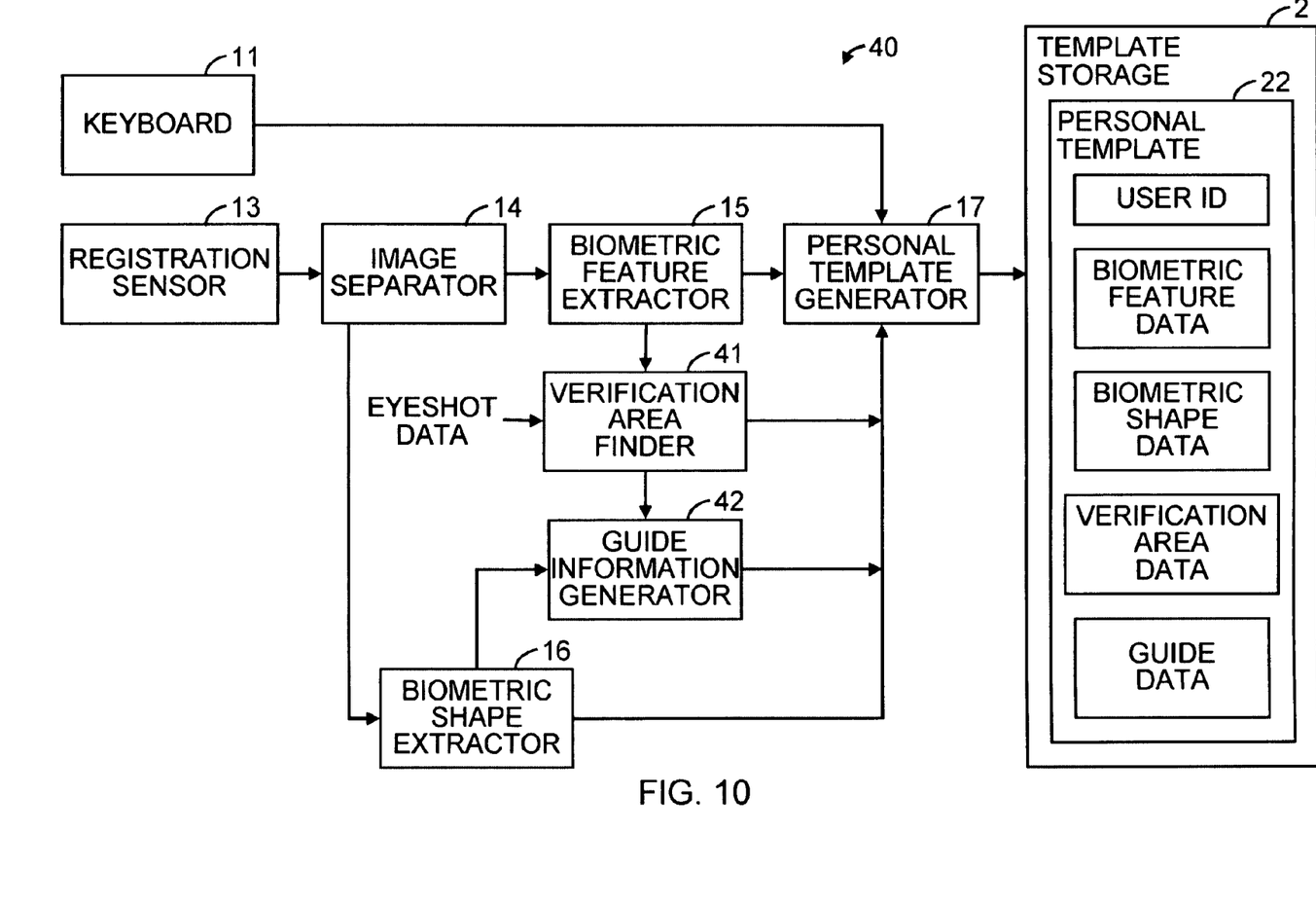
FIG. 10 is a block diagram illustrating an overview of a biometric data registration apparatus according to a second embodiment of the present invention.

FIG. 10 is a block diagram illustrating an overview of a biometric data registration apparatus according to a second embodiment of the present invention. A biometric data registration apparatus 40 according to the second embodiment corresponds to a biometric authentication apparatus for which the use of a specific verification sensor is predetermined. Among elements of the biometric data registration apparatus 40 illustrated in FIG. 10, like elements of the biometric data registration apparatus 10 illustrated in FIG. 1 are denoted by like reference numerals. The biometric data registration apparatus 40 is different from the biometric data registration apparatus 10 in that a verification area finder 41 and a guide information generator 42 are provided.

A user ID is input via a keyboard 11, and a registration sensor 13 captures a biometric image. The biometric image captured by the registration sensor 13 is sent to an image separator 14. The image separator 14 separates the biometric image into an image of biometric features required for personal authentication and an image of a biometric shape. The image of biometric features separated from the biometric image is sent to a biometric feature extractor 15. The biometric feature extractor 15 extracts biometric feature information from the image of biometric feature and converts it into numeric data to obtain biometric feature data. The image of a biometric shape separated from the biometric image is sent to a biometric shape extractor 16. The biometric shape extractor 16 extracts biometric shape information from the image of a biometric shape and converts it into numeric data to obtain biometric shape data.

The biometric feature data obtained by the biometric feature extractor 15 is sent to a personal template generator 17 and to the verification area finder 41.

In the second embodiment, since the use of a specific verification sensor is predetermined, eyeshot data including the shape and size of the eyeshot of the verification sensor has been preset to the verification area finder 41. The verification area finder 41 calculates densities of biometric features in partial areas having the shape and size indicated by the preset eyeshot data within the entire image of biometric features. The verification area finder 41 then determines, as a verification area, an area having the highest one of the calculated densities of biometric features, and sends data (referred to as verification area data) of the verification area to the personal template generator 17. The verification area finder 41 also sends the verification area data to the guide information generator 42. In the second embodiment, similarly to the first embodiment, the optimum amount of biometric features may be determined based on the amount of high-frequency components instead of the density, and the method for determining the verification area is not limited.

On the other hand, the biometric shape data obtained by the biometric shape extractor 16 is sent to the personal template generator 17 and is also sent to the guide information generator 42. The guide information generator 42 uses the biometric shape data and the verification area data to generate a guide pattern. One example of the guide pattern is a combination of images of the biometric shape and the verification area displayed on a display device, which indicates the position of the body part that the user should align with the verification sensor 36. Data (referred to as guide data) of the guide pattern generated by the guide information generator 42 is sent to the personal template generator 17.

The user ID, the biometric feature data, the biometric shape data, the verification area data, and the guide data are sent to the personal template generator 17. The personal template generator 17 generates a personal template 22 containing the user ID, the biometric feature data, the biometric shape data, the verification area data, and the guide data, for the person identified by the user ID. The generated personal template 22 is stored in the template storage 2.

As discussed above, the verification area finder 41 and the guide information generator 42 are provided at the biometric data registration apparatus 40 side to pre-determine the verification area and the guide pattern, which are stored in the template storage 2 as contents of the personal template 22. The biometric data registration apparatus 40 may be used when a verification sensor used is predetermined, and may allow reduction of the amount of processing time at the verification stage.

Figure 11:
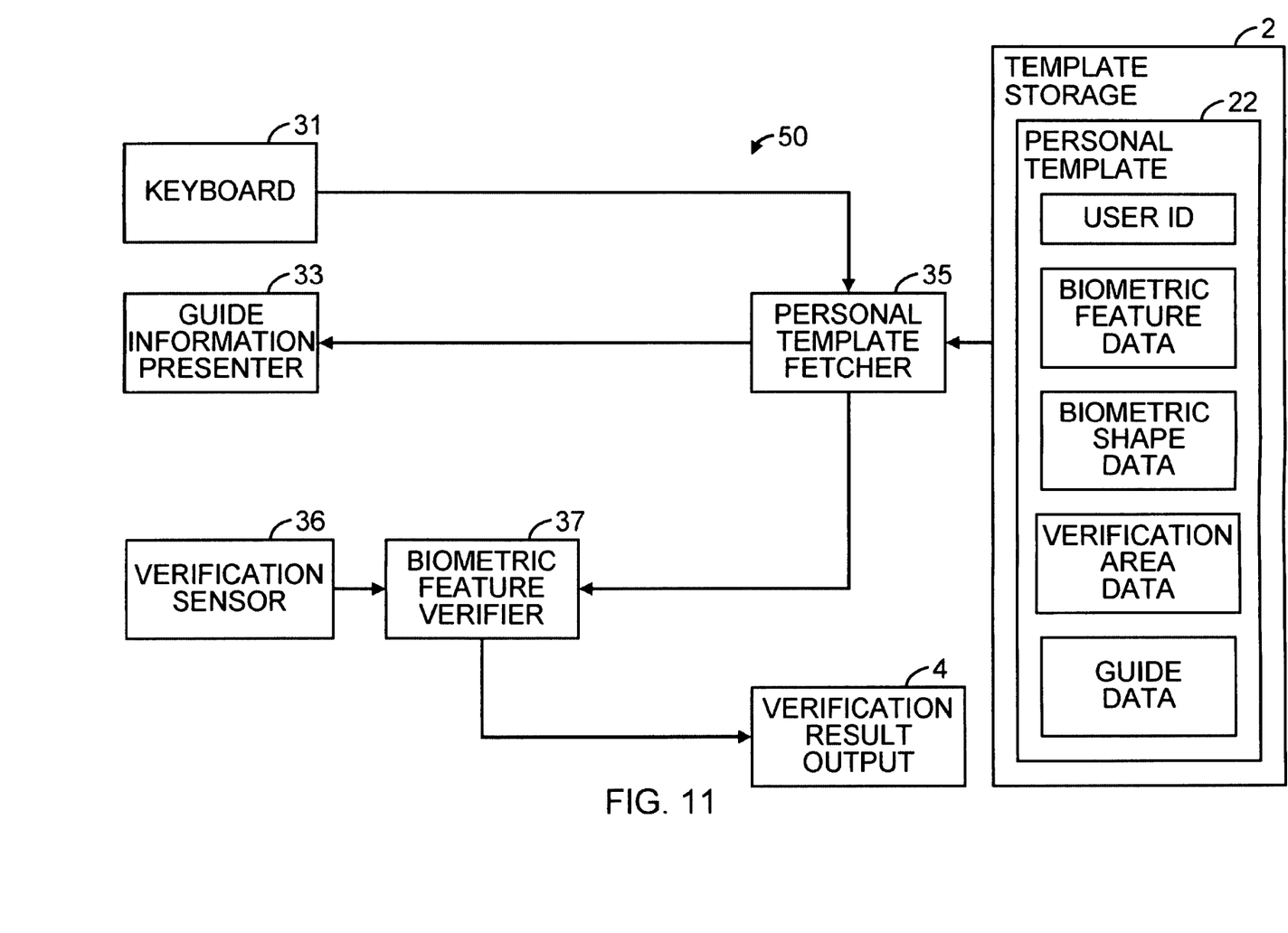
FIG. 11 is a block diagram illustrating an overview of a biometric authentication apparatus according to a second embodiment of the present invention.

FIG. 11 is a block diagram illustrating an overview of a biometric authentication apparatus according to a second embodiment of the present invention. The biometric authentication apparatus uses data stored in the biometric data registration apparatus illustrated in FIG. 10.

A biometric authentication apparatus 50 has a configuration in which the verification area finder 38 and the guide information generator 34 are eliminated from the biometric authentication apparatus 30 illustrated in FIG. 3. In FIG. 11, like elements as those illustrated in FIG. 3 are denoted by like reference numerals.

First, a user ID is input via a keyboard 31. The input user ID is sent to a personal template fetcher 35. In accordance with the input user ID, the personal template fetcher 35 fetches a pertinent personal template 22 from the template storage 2. The personal template 22 contains verification area data of a verification sensor 36 and guide data, as well as the biometric feature data and the biometric shape data of the user. The personal template fetcher 35 sends the guide data contained in the fetched personal template 22 to a guide information presenter 33. The guide information presenter 33 includes, for example, a display device and displays, on the screen of the display device, an image representing the verification area in an image of a contour of a body part such as a palm of the user.

In accordance with the guide pattern presented by the guide information presenter 33, the user may correctly align his/her body part that provides biometric feature with the verification sensor 36. The verification sensor 36 captures an image of biometric features, extracts biometric feature information from the captured image of biometric features, converts extracted biometric feature information into numeric data to obtain biometric feature data, and sends obtained biometric feature data to a biometric feature verifier 37. The biometric feature verifier 37 then verifies the received biometric feature data in comparison with the biometric feature data in the verification area received from the personal template fetcher 35. The result of the verification is provided as a verification result output 4.

When a plurality of verification sensors having different eyeshot are used, a verification area and a guide pattern may be obtained in advance for each of the verification sensors. All the obtained verification areas and the guide patterns are contained in a personal template to allow for selection of an appropriate verification area and an appropriate guide pattern in accordance with a verification sensor actually used.

Although an example of biometric authentication using palm veins has been discussed in the above embodiments, the present invention may also be applied to biometric authentication using features of any body part, such as a fingerprint, a facial image, or an iris. For cases in which features are obtained through contact with a sensor, such as a case in which a fingerprint is obtained, for example, a sensor that detects a pressure may also be used.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A biometric authentication apparatus for authenticating users, comprising:
    an ID acceptor configured to accept input of a user ID;
    a personal template fetcher configured to fetch a personal template corresponding to the user ID, the personal template containing registered biometric feature data and registered biometric shape data, the biometric feature data indicating density of biometric features;
    a verification sensor configured to obtain input biometric feature data of a user, the verification sensor having a detection area smaller than a detection area of a registration sensor used in registering the registered biometric feature data;
    a guide information presenter configured to present guide information to guide, in accordance with the registered biometric shape data and data indicating a position of a verification area, the user to place a body part of the user over the verification sensor so as to obtain the input biometric feature data in an area corresponding to the verification area,
        the verification area being within the body part providing biometric features corresponding to the registered biometric feature data,
        the verification area corresponding to the detection area of the verification sensor,
        the verification area providing highest density of the biometric features among calculated areas in the detection area of the registration sensor; and
    a biometric feature verifier configured to verify the input biometric feature data in comparison with the registered biometric feature data in the verification area.

2. The biometric authentication apparatus of claim 1, further comprising:
    a verification area finder configured to generate the data indicating the position of the verification area on the basis of the registered biometric feature data and data of the detection area of the verification sensor.

3. The biometric authentication apparatus of claim 1, wherein
    the personal template further contains the data indicating the position of the verification area.

4. The biometric authentication apparatus of claim 1, wherein
    the guide information presenter includes a display screen configured to display a contour of the body part, the display screen being disposed around the verification sensor.

5. The biometric authentication apparatus of claim 1, wherein the guide information presenter
    includes a device configured to capture an image of a shape of the body part,
    calculates a difference between the image captured by the device and an image reconstructed from the registered biometric shape data while aligning the verification area with the detection area of the verification sensor, and
    guides the user by using sound or light in accordance with the difference.

6. A biometric data registration apparatus for registering biometric data, comprising:
    an ID acceptor configured to accept input of a user ID;
    a registration sensor configured to capture an image of a body part of a user to the extent that an image of a shape of the body part is included, the body part providing biometric features, the registration sensor having a detection area larger than a detection area of a verification sensor used in verifying biometric feature data input for authentication;
    an image separator configured to separate a captured image of the body part into an image of biometric features and an image of a biometric shape;
    a personal template generator configured to generate a personal template containing the user ID, biometric feature data obtained from the image of the biometric features, and biometric shape data obtained from the image of the biometric shape; and
    a verification area finder configured to generate data indicating a position, in the image of the shape of the body part, of a verification area,
        the verification area being within the body part providing biometric features,
        the verification area corresponding to the detection area of the verification sensor used in verification, the verification area providing highest density of the biometric features among calculated areas in the detection area of the registration sensor;
wherein the biometric feature data indicates density of the biometric features, and
the personal template further contains the data indicating the position of the verification area.

7. The biometric data registration apparatus of claim 6, wherein
the registration sensor captures a plurality of images of portions of the body part and generates the image of the body part to the extent that the image of the shape of the body part is included.

8. A biometric authentication method executed by a biometric authentication apparatus for authenticating users, the biometric authentication method comprising:
accepting input of a user ID;
fetching a personal template corresponding to the user ID, the personal template containing registered biometric feature data and registered biometric shape data, the biometric feature data indicating density of biometric features;
presenting guide information to guide, in accordance with the registered biometric shape data and data indicating a position of a verification area, a user to place a body part of the user over a verification sensor so as to obtain the input biometric feature data in an area corresponding to the verification area,
the verification area being within the body part providing biometric features corresponding to the registered biometric feature data,
the verification area corresponding to a detection area of the verification sensor,
the verification area providing highest density of the biometric features among calculated areas in a detection area of a registration sensor;
obtaining the input biometric feature data of the user via the verification sensor, the verification sensor having the detection area smaller than the detection area of the registration sensor used in registering the registered biometric feature data; and
verifying the input biometric feature data in comparison with the registered biometric feature data in the verification area.

9. The biometric authentication method of claim 8, wherein the presenting guide information includes:
displaying an image reconstructed from the registered biometric shape data.

* * * * *